United States Patent
Murakami et al.

(10) Patent No.: US 9,046,145 B2
(45) Date of Patent: Jun. 2, 2015

(54) SHOCK ABSORBER

(75) Inventors: Hiroshi Murakami, Yokohama (JP);
Osamu Yuno, Yokohama (JP);
Tomohiko Fujioka, Yokohama (JP);
Takashi Nezu, Yokohama (JP);
Shunsuke Mori, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 22 days.

(21) Appl. No.: 13/479,821

(22) Filed: May 24, 2012

(65) Prior Publication Data
US 2012/0305349 A1    Dec. 6, 2012

(30) Foreign Application Priority Data

May 31, 2011 (JP) ................................. 2011-121831
Feb. 29, 2012 (JP) ................................. 2012-043679

(51) Int. Cl.
*F16F 9/34*    (2006.01)
*F16F 9/46*    (2006.01)
*F16F 9/32*    (2006.01)

(52) U.S. Cl.
CPC ................. *F16F 9/464* (2013.01); *F16F 9/325* (2013.01); *F16F 2226/04* (2013.01)

(58) Field of Classification Search
CPC ......... F16F 9/325; F16F 9/342; F16F 9/3257; F16F 9/512; F16F 9/465
USPC .......... 188/266.1, 266.2, 266.5, 266.6, 299.1
See application file for complete search history.

(56) References Cited

U.S. PATENT DOCUMENTS

| | | | | |
|---|---|---|---|---|
| 5,398,787 A | * | 3/1995 | Woessner et al. | 188/266.6 |
| 5,730,261 A | * | 3/1998 | Spakowski et al. | 188/266.6 |
| 6,155,391 A | * | 12/2000 | Kashiwagi et al. | 188/266.6 |
| 2009/0242339 A1 | | 10/2009 | Nakadate et al. | |
| 2011/0073424 A1 | * | 3/2011 | Murakami | 188/322.13 |

FOREIGN PATENT DOCUMENTS

| | | | |
|---|---|---|---|
| DE | 3844642 A1 | * | 5/1990 |
| JP | 2009-281584 | | 12/2009 |

* cited by examiner

*Primary Examiner* — Thomas J Williams
(74) *Attorney, Agent, or Firm* — Wenderoth, Lind & Ponack, L.L.P.

(57) ABSTRACT

A shock absorber in which a flow of hydraulic oil caused by sliding movement of a piston in a cylinder is controlled by a pilot type main valve and a pilot valve to generate damping force. The valve-opening operation of the main valve is controlled by adjusting the pressure in a pilot chamber with the pilot valve. A valve block and a solenoid block are connected together into one unit and inserted into a casing before being secured with a nut. At this time, an actuating rod of the solenoid block is engaged with a pilot valve member retained by a pilot spring and a fail-safe spring in a cylindrical portion of a pilot body of the valve block.

24 Claims, 9 Drawing Sheets

SHOCK ABSORBER

BACKGROUND OF THE INVENTION

The present invention relates to shock absorbers such as hydraulic shock absorbers that generate a damping force by controlling the flow of a fluid against the stroke of a piston rod.

In general, shock absorbers attached to the suspension systems of automobiles or other vehicles are arranged as follows. A piston connected with a piston rod is slidably fitted in a cylinder having a fluid sealed therein. In response to a stroke of the piston rod, the piston slidingly moves in the cylinder, causing a flow of fluid. The flow of fluid is controlled to generate a damping force by a damping force generating mechanism comprising an orifice, a disk valve, etc.

In a hydraulic shock absorber disclosed in Japanese Patent Application Publication No. 2009-281584, for example, a back-pressure chamber (pilot chamber) is formed at the back of a main disk valve constituting a damping force generating mechanism. A part of the flow of fluid is introduced into the back-pressure chamber to apply the pressure in the back-pressure chamber to the main disk valve in the direction for closing the valve. The valve-opening operation of the main disk valve is controlled by adjusting the pressure in the back-pressure chamber with a solenoid valve (pilot valve). With this arrangement, it is possible to increase the degree of freedom for adjusting damping force characteristics.

The following problems are associated with a shock absorber having a damping force generating mechanism comprising a main disk valve, a back-pressure chamber, a solenoid valve, and so forth as disclosed in the above-mentioned Japanese Patent Application Publication No. 2009-281584. That is, the related-art shock absorber is complicated in structure and high in parts count. It is also necessary to ensure dimensional and assembling accuracies and sealability for various component parts. Further, the related-art shock absorber requires wiring to the solenoid. Thus, various schemes are required to increase productivity.

SUMMARY OF THE INVENTION

An object of the present invention is to provide a shock absorber capable of increasing the productivity of the damping force generating mechanism.

To solve the above-described problems, the present invention provides a shock absorber including a cylinder having a hydraulic fluid sealed therein, a piston slidably fitted in the cylinder, a piston rod connected to the piston and extended to the outside of the cylinder, and a damping force generating mechanism generating damping force by controlling a flow of hydraulic fluid caused or induced by sliding movement of the piston in the cylinder. The damping force generating mechanism includes a valve block and a solenoid block. The valve block has a casing member provided with an opening, a valve member retained in the casing member to selectively seat on and unseat from a seat portion formed in the casing member, and an urging member provided in the casing member to urge the valve member toward the seat portion. The solenoid block has an actuating rod facing the valve member retained in the casing member of the valve block. The solenoid block is connectable to the valve block. The valve member and the actuating rod are engaged with each other when the valve block and the solenoid block are connected to each other.

PREFERRED EMBODIMENTS OF THE INVENTION

Embodiments of the present invention will be explained below in detail with reference to the accompanying drawings.

Figure 1:
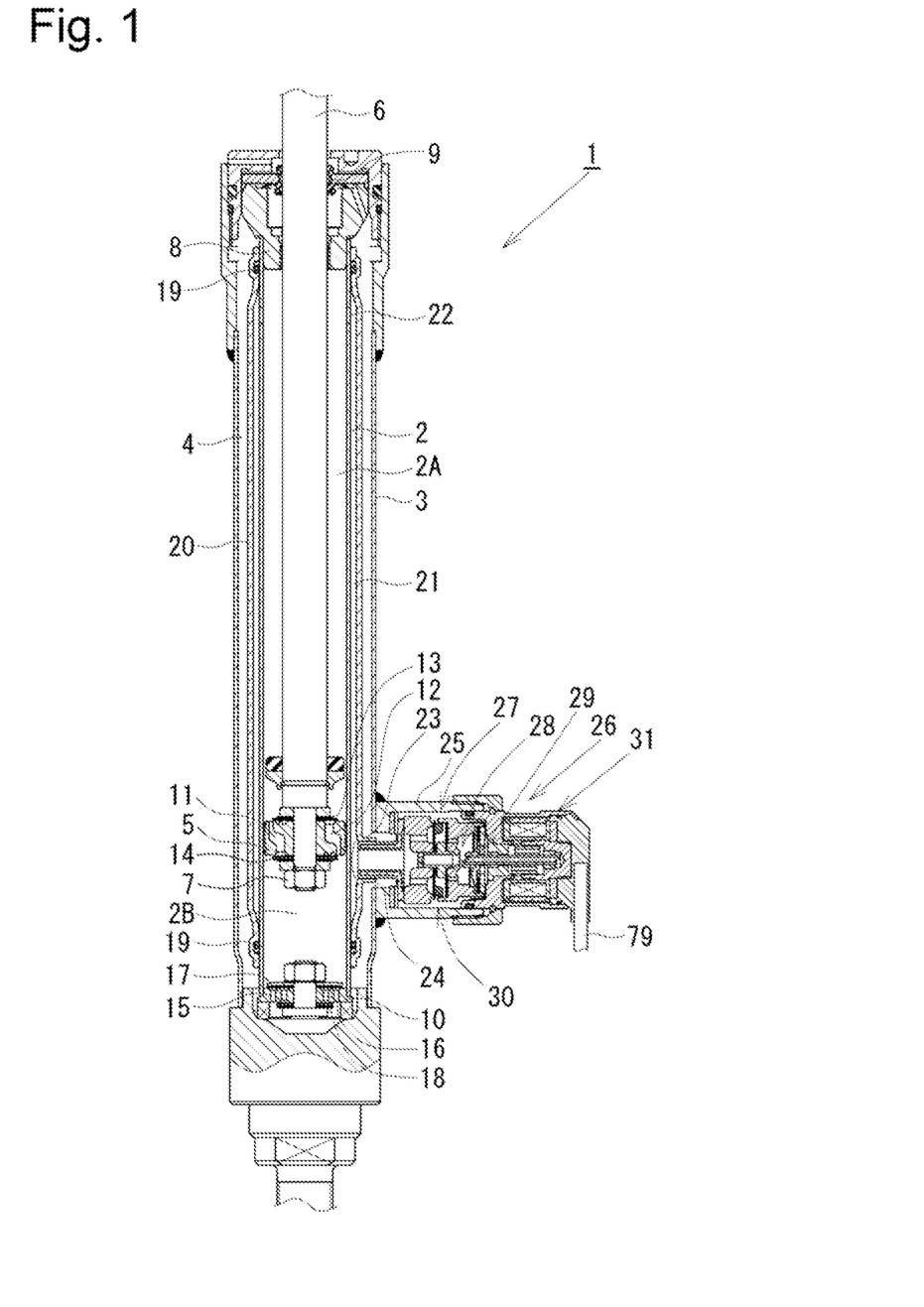
FIG. 1 is a vertical sectional view of a shock absorber according to a first embodiment of the present invention.

As shown in FIG. 1, a damping force control type shock absorber 1 as a shock absorber according to a first embodiment has a twin-tube structure comprising a cylinder 2 and an outer tube 3 provided around the outer periphery of the cylinder 2. A reservoir 4 is formed between the cylinder 2 and the outer tube 3. A piston 5 is slidably fitted in the cylinder 2. The piston 5 divides the interior of the cylinder 2 into two chambers, i.e. a cylinder upper chamber 2A and a cylinder lower chamber 2B. The piston 5 has one end of a piston rod 6 connected thereto by a nut 7. The other end of the piston rod 6 extends through the cylinder upper chamber 2A and through a rod guide 8 and an oil seal 9, which are provided in the upper end of the twin-tube structure comprising the cylinder 2 and the outer tube 3. Thus, the other end of the piston rod 6 extends to the outside of the cylinder 2. A base valve 10 is provided in the lower end of the cylinder 2 to divide the cylinder lower chamber 2B and the reservoir 4 from each other.

The piston 5 is provided with passages 11 and 12 for communication between the cylinder upper chamber 2A and the cylinder lower chamber 2B. The passage 12 is provided with a check valve 13 for allowing only a flow of fluid from the cylinder lower chamber 2B to the cylinder upper chamber 2A. The passage 11 is provided with a disk valve 14 that opens when the fluid pressure in the cylinder upper chamber 2A reaches a predetermined pressure to relieve the pressure to the cylinder lower chamber 2B.

The base valve 10 is provided with passages 15 and 16 for communication between the cylinder lower chamber 2B and the reservoir 4. The passage 15 is provided with a check valve 17 for allowing only a flow of fluid from the reservoir 4 to the cylinder lower chamber 2B. The passage 16 is provided with a disk valve 18 that opens when the fluid pressure in the cylinder lower chamber 2B reaches a predetermined pressure to relieve the pressure to the reservoir 4.

The cylinder 2 has a hydraulic liquid sealed therein as a hydraulic fluid. The reservoir 4 has the hydraulic liquid and a gas sealed therein.

The cylinder 2 has a separator tube 20 fitted thereover with seal members 19 interposed therebetween at the upper and lower ends of the cylinder 2. An annular passage 21 is formed between the cylinder 2 and the separator tube 20. The annular passage 21 is communicated with the cylinder upper chamber 2A through a passage 22 provided in the side wall of the cylinder 2 near the upper end thereof. The separator tube 20 has a circular cylindrical connecting port 23 provided in a lower part thereof. The connecting port 23 projects sideward and is open at both ends thereof. The side wall of the outer tube 3 is provided with an opening 24 in concentric relation to the connecting port 23. The opening 24 is larger in diameter than the connecting port 23. A circular cylindrical casing 25 is connected to the side wall of the outer tube 3 by welding or the like so as to surround the opening 24. A damping force generating mechanism 26 is attached to the casing 25.

Next, the damping force generating mechanism 26 will be explained with reference mainly to FIGS. 2 to 6. The damping force generating mechanism 26 has a valve block 30 (see FIGS. 2 and 5) and a solenoid block 31 (see FIGS. 2 and 5) that actuates a pilot valve 28.

The valve block 30 (see FIGS. 2 and 5) has a main valve 27, a pilot valve 28, and a fail-safe valve 29, which are incorporated into one unit. The main valve 27 is a pilot type (back-pressure type) valve. The pilot valve 28 is a solenoid-driven pressure control valve for controlling the valve-opening pressure of the main valve 27. The fail-safe valve 29 is provided downstream of the pilot valve 28 to operate when there is a failure. An annular spacer 32 and a passage member 33 are inserted into the casing 25. The valve block 30 and the solenoid block 31 are connected together into one unit. The united valve and solenoid blocks 30 and 31 are inserted and secured in the casing 25 by screwing a nut 34 onto the casing 25.

Figure 2:
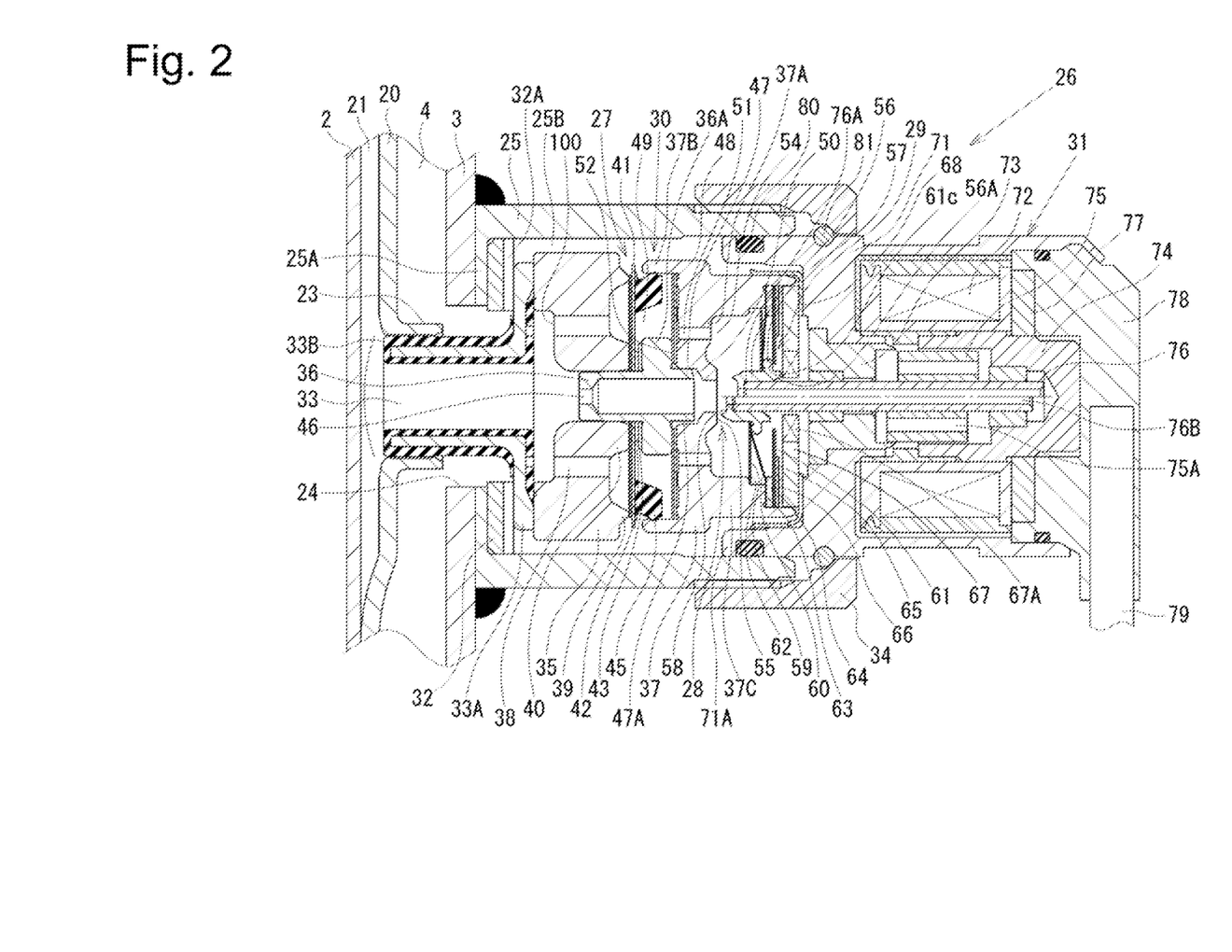
FIG. 2 is an enlarged vertical sectional view of a damping force generating mechanism of the shock absorber shown in FIG. 1.

The spacer 32 is secured in abutting contact with an inner flange 25A formed at an end of the casing 25. The spacer 32 has a plurality of notches 32A for communication between the reservoir 4 and a chamber 25B in the casing 25. The passage member 33 is a circular cylindrical member having a flange portion 33A around the outer periphery of one end thereof and extending through the spacer 32. The passage member 33 is secured with a distal end thereof inserted into the connecting port 23 and the flange portion 33A abutting against the spacer 32. The passage member 33 is covered with a sealing member 33B to seal the joints between the passage member 33, on the one hand, and, on the other, the connecting port 23 and a main body 35 (described later) of the valve block 30.

The valve block 30 has the main body 35, a pilot pin 36, which is a connecting member, and a pilot body 37, which is a casing member having an opening. The main body 35 is substantially annular and abuts at one end thereof against the flange portion 33A of the passage member 33. The main body 35 is provided with a plurality of circumferentially spaced passages 38 axially extending therethrough. The passages 38 communicate with a passage in the passage member 33 through an annular recess 100 formed at one end of the main body 35. The other end of the main body 35 has an annular seat portion 39 projecting at the outer periphery of the openings of the passages 38 and further has an annular clamp portion 40 projecting at the inner periphery of the openings of the passages 38. A main disk valve 41 is seated at an outer peripheral portion thereof on the seat portion 39 of the main body 35. The main disk valve 41 is a disk valve constituting the main valve 27. The inner peripheral portion of the main disk valve 41 is clamped, together with a retainer 42 and a washer 43, by the clamp portion 40 and the pilot pin 36. The main disk valve 41 has an annular sliding seal member 45 fixed to the outer peripheral portion of the rear side thereof by a method, for example, baking. The main disk valve 41 comprises a stack of three disks (see FIG. 4): a disk 41A having the sliding seal member 45 fixed thereto; a disk 41B for adjusting the flexural rigidity of the main disk valve 41; and a slit disk 41C having slits 41D formed in the outer peripheral edge thereof. The slits 41D form orifices for setting damping force in the low piston speed region.

Figure 6:
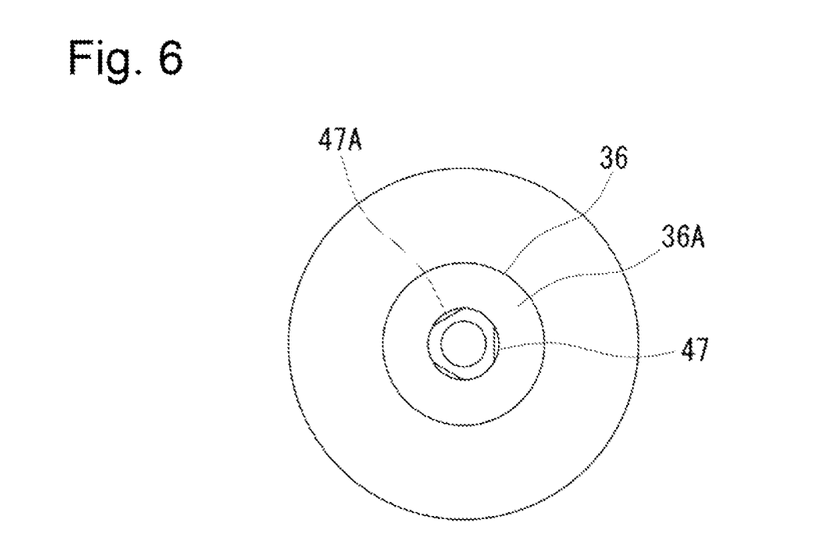
FIG. 6 is an enlarged view of fitting portions of a pilot pin and pilot body of the damping force generating mechanism shown in FIG. 2.

The pilot pin 36 is in the shape of a stepped circular cylinder having an enlarged-diameter portion 36A in the middle thereof. The pilot pin 36 has an orifice 46 formed at one end thereof. The one end of the pilot pin 36 is press-fitted into the main body 35. Thus, the main disk valve 41 is clamped by the main body 35 and the enlarged-diameter portion 36A. The other end of the pilot pin 36 forms a fitting portion that is press-fitted into a passage 50 in the pilot body 37. As shown in FIG. 6, the other end of the pilot pin 36 has an outer peripheral portion chamfered at three equally spaced positions to form a chamfered portion 47 of substantially triangular cross-section having three axially extending cut portions. When the chamfered portion 47 is press-fitted into the passage 50 of the pilot body 37, which is a central fitting hole, three axially extending passages 47A are formed between the chamfered portion 47 and the inner wall of the passage 50. The pilot pin 36, which has a three-surface chamfered portion 47 of substantially triangular cross-section, can be formed easily by forging, for example. The method of forming the pilot pin 36 is not limited to forging. The chamfered portion 47 may be formed by cutting a circular cylindrical member. If the pilot pin 36 is formed by forging, there are no cuttings or the like, which would otherwise be generated by cutting process. Therefore, contamination is unlikely to occur, and it is possible to improve not only productivity but also reliability.

The pilot body 37 is in the shape of a substantially circular cylinder having a bottom 37A in the middle thereof. The pilot body 37 has a passage 50 extending through the center of the bottom 37A. The chamfered portion 47 of the pilot pin 36 is press-fitted into the passage 50. The bottom 37A of the pilot body 37 abuts against the enlarged-diameter portion 36A of the pilot pin 36 with a flexible disk 48 (described later) interposed therebetween. The pilot body 37 has a circular cylindrical portion 37B formed at one end thereof. The sliding seal member 45 of the main disk valve 41 is slidably and fluid-tightly fitted to the inner peripheral surface of the cylindrical portion 37B to form a back-pressure chamber 49 at the back of the main disk valve 41. The main disk valve 41 lifts from the seat portion 39 to open upon receiving the passage 38-side pressure, thereby allowing the passages 38 to communicate with the chamber 25B in the casing 25, which is at the downstream side of the main disk valve 41. The pressure in the back-pressure chamber 49 acts on the main disk valve 41 in the direction for closing the valve 41.

The pilot body 37 has passages 51 extending through the bottom 37A thereof. A flexible disk 48 is seatable on a seat portion projecting from the periphery of the openings of the passages 51. The flexible disk 48 deflects when the pressure in the back-pressure chamber 49 increases, thereby applying volumetric elasticity to the back-pressure chamber 49. In other words, the flexible disk 48 deflects to allow the volumetric capacity of the back-pressure chamber 49 to be increased to prevent the pressure in the back-pressure chamber 49 from excessively increasing due to the valve-opening operation of the main disk valve 41, which would otherwise cause the valve-opening operation of the main disk valve 41 to become unstable. In addition, the hydraulic fluid residing between the flexible disk 48 and the pilot body 37 is allowed to escape into a valve chamber 54 through the passages 51. The flexible disk 48 comprises a stack of two disks 48A and 48B (see FIG. 4). The flexible disk 48 has diametrically aligned elongated notches 52 formed on the inner peripheral edge of the disk 48A, which abuts against the pilot pin 36. The back-pressure chamber 49 and the passage 50 are communicated with each other by the notches 52 and the passages 47A. The passages 47A are formed between the chamfered portion 47 of the pilot pin 36 and the inner wall of the passage 50 in the pilot body 37, as has been stated above.

The pilot body 37 has a circular cylindrical portion 37C at the other end of the pilot body 37. A valve chamber 54 is formed in the cylindrical portion 37C as an opening of the pilot body 37. The bottom 37A of the pilot body 37 has a seat portion 55 projecting from the peripheral edge of the opening of the passage 50. The valve chamber 54 is provided therein with a pilot valve member 56 as a valve member constituting the pilot valve 28, which selectively unseats from and seats on the seat portion 55 to open and close the passage 50. The pilot valve member 56 is substantially circular cylindrical and tapered at a distal end portion thereof that selectively seats on and unseats from the seat portion 55. The pilot valve member 56 has a flange-shaped spring retaining portion 57 of large diameter on the outer periphery of the proximal end thereof. The pilot valve member 56 has a rod-receiving portion 58 of small diameter defined by the inner periphery of the distal end thereof. The inner peripheral edge of the opening at the rear of the pilot valve member 56 is gradually enlarged in diameter to form a tapered portion 56A. It should be noted that the spring retaining portion 57 acts as a pressure-receiving surface that receives the pressure in the valve chamber 54 in the state of abutting against a fail-safe disk 61. Therefore, in order to reduce the force for moving the pilot valve member 56 against the pressure in the valve chamber 54, it is desirable to reduce the diameter of the spring retaining portion 57 as much as possible while ensuring a diameter required for the spring retaining portion 57 to abut against a pilot spring 59 and the fail-safe disk 61.

The pilot valve member 56 is resiliently retained axially movably in opposing relation to the seat portion 55 by the pilot spring 59 as an urging member, a fail-safe spring 60, and the fail-safe disk 61. The cylindrical portion 37C at the other end of the pilot body 37 has two step portions 62 and 63 formed on the inner periphery thereof so that the inner diameter of the cylindrical portion 37C stepwisely increases toward the opening end thereof. The radially outer end portion of the pilot spring 59 is supported by the step portion 62. The step portion 63 supports a stack of a fail-safe spring 60, an annular retainer 64, a fail-safe disk 61, a retainer 65, a spacer 66, and a retaining plate 67. These stacked members are secured to the step portion 63 by a cap 68 fitted to the distal end of the cylindrical portion 37C.

Figure 3:
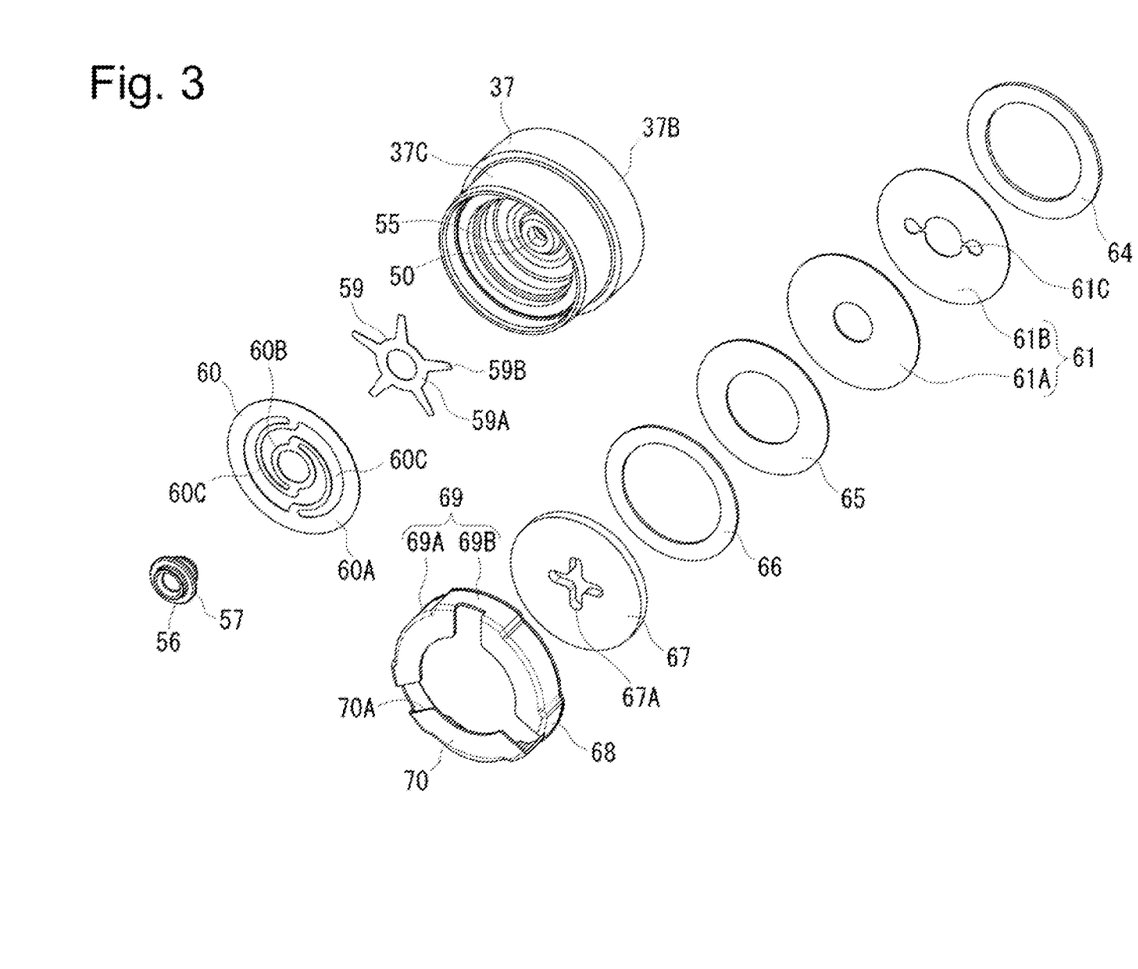
FIG. 3 is an exploded perspective view of a pilot valve section of a valve block of the damping force generating mechanism shown in FIG. 2.

As shown in FIG. 3, the fail-safe spring 60 has an integral structure comprising a large-diameter portion 60A, a small-diameter portion 60B, and a pair of substantially semicircular spring portions 60C. The large-diameter portion 60A abuts against the step portion 63. The small-diameter portion 60B is disposed in concentric relation to the large-diameter portion 60A to abut against the spring retaining portion 57 of the pilot valve member 56 as inserted therethrough. The pair of spring portions 60C connect the large-diameter portion 60A and the small-diameter portion 60B. The spring portions 60C are disposed to be diametrically offset from each other. The cuter side of one end of each spring portion 60C is connected to an inner peripheral portion of the large-diameter portion 60A, and an outer peripheral portion of the small-diameter portion 60B is connected to the inner side of the other end of the spring portion 60C, thereby applying a spring force to the relative axial movement between the large-diameter portion 60A and the small-diameter portion 60B.

The pilot spring 59 has an annular abutting portion 59A and a plurality (five in the illustrated example) of circumferentially equally spaced spring portions 59B extending radially from the outer periphery of the abutting portion 59A. The abutting portion 59A abuts against the spring retaining portion 57 of the pilot valve member 56 as inserted thereinto. The pilot spring 59 is disposed in the cylindrical portion 37C of the pilot body 37 so that the distal ends of the spring portions 59B abut against the step portion 62. The retaining plate 67 has a substantially crisscross passage 67A provided in the center thereof to communicate between the valve chamber 54 and the chamber 25B in the casing 25. The retaining plate 67 limits the retract position of the pilot valve member 56 by abutting against the latter.

The fail-safe disk 61 comprises a disk 61A and a notched disk 61B, which are superimposed on one another. The notched disk 61B has a pair of diametrically aligned elongated notches 61C formed on the inner peripheral edge thereof. The notches 61C have round holes at their respective radially outer ends to reduce the stress concentration. The notches 61C of the notched disk 61B form a passage functioning as an orifice when the spring retaining portion 57 of the pilot valve member 56 abuts against the notched disk 61B.

The cap 68 has a circular cylindrical side wall 69 on which a small-diameter portion 69A and a large-diameter portion 69B are alternately formed along the circumferential direction. The cap 68 has an inward flange portion 70 at an end thereof. The inward flange portion 70 has notches 70A radially extending from the inner peripheral edge thereof to the peripheral edges of the large-diameter portions 69B. The small-diameter portions 69A of the cap 68 are fitted to the outer periphery of the cylindrical portion 37C at the other end of the pilot body 37, and the large-diameter portions 69B of the cap 68 are fitted to the inner periphery of a circular cylindrical portion of a solenoid case 71 (described later). In this fitted state, the notches 70A form a passage communicating between the valve chamber 54 and the chamber 25B in the casing 25.

The retainer 64 clamps the outer peripheral portion 60A of the fail-safe spring 60. The retainer 65 serves as a support for deflection of the fail-safe disk 61. The spacer 66 ensures a desired amount of deflection of the fail-safe disk 61.

The solenoid block 31 has a coil 72, cores 73 and 74 inserted in the coil 72, a plunger 75 guided by the cores 73 and 74, and a hollow actuating rod 76 connected to the plunger 75, which are incorporated in the solenoid case 71 as one unit. The components of the solenoid block 31 are secured by an annular spacer 77 and a cup-shaped cover 78, which are attached to the rear end of the solenoid case 71 by staking. The coil 72, the cores 73 and 74, the plunger 75, and the actuating rod 76 constitute in combination a solenoid actuator. When the coil 72 is supplied with an electric current through a lead wire 79, axial thrust is generated in the plunger 75 according to the supplied electric current. The distal end of the actuating rod 76 is tapered to form a tapered portion 76A on the outer peripheral edge thereof. A communicating passage 76B is formed in the hollow actuating rod 76. The communicating passage 76B communicates between the passage 50 and the valve chamber 54, on the one hand, and, on the other, a chamber at the rear of the actuating rod 76. The plunger 75 is provided with a plurality of communicating passages 75A communicating between two chambers formed at the opposite ends of the plunger 75. The communicating passages 76B and 75A allow balancing the fluid forces acting on the actuating rod 76 and the plunger 75 and also apply appropriate damping force to the movement of the actuating rod 76 and the plunger 75.

The solenoid case 71 has at one end thereof a circular cylindrical portion 71A fitted into the casing 25. The large-diameter portions 69B of the cap 68 attached to the pilot body 37 are fitted into the cylindrical portion 71A. An O-ring 80 seals between the cylindrical portion 71A and the casing 25.

The distal end of the actuating rod 76, which projects into the cylindrical portion 71A, is inserted into the pilot valve member 56 incorporated in the valve block 30 so that the distal end of the actuating rod 76 abuts against the rod-receiving portion 58. The large-diameter portions 69B of the cap 68, which is attached to the pilot body 37, is fitted into the cylindrical portion 71A. Thus, the solenoid case 71 is connected to the valve block 30 by inserting the distal end of the actuating rod 76 into the pilot valve member 56 and fitting the large-diameter portions 69B of the cap 68 into the cylindrical portion 71A. The solenoid case 71 has a retaining ring 81 fitted in a groove on the outer periphery thereof. The solenoid case 71 is secured to the casing 25 by holding the retaining ring 81 with the nut 34.

When the coil 72 is not energized in a state where the valve block 30 and the solenoid block 31 have been connected and the actuating rod 76 has been inserted into the pilot valve member 56, as shown in the upper half of FIG. 2 (i.e. the upper side of FIG. 2 with respect to the center line of the actuating rod 76 when the reference numerals in the drawing are viewed as erect; the same shall apply hereinafter), the pilot valve member 56 is retracted by the spring force of the fail-safe spring 60, together with the actuating rod 76, so that the spring retaining portion 57 abuts against the fail-safe disk 61. At this time, the spring portions 59B of the pilot spring 59 are separate from the step portion 62 and therefore apply no spring force to the pilot valve member 56. When the coil 72 is energized, as shown in the lower half of FIG. 2 (i.e. the lower side of FIG. 2 with respect to the center line of the actuating rod 76 when the reference numerals in the drawing are viewed as erect; the same shall apply hereinafter), the pilot valve member 56 is advanced toward the seat portion 55 by the actuating rod 76, causing the spring portions 59B of the pilot spring 59 to abut against the step portion 62, and seating the pilot valve member 56 on the seat portion 55 against the spring forces of the fail-safe spring 60 and the pilot spring 59, and thus controlling the valve-opening pressure according to the electric current supplied to the coil 72.

Next, the assembling of the valve block 30 will be explained with reference to FIG. 3.

The pilot spring 59 is inserted into the cylindrical portion 37C of the pilot body 37 so that the distal ends of the spring portions 59B face the step portion 62. Next, the fail-safe spring 60 is inserted into the cylindrical portion 37C so that the outer periphery of the fail-safe spring 60 abuts against the step portion 63. The pilot valve member 56 is inserted into the small-diameter portion 60B of the fail-safe spring 60 so that the spring retaining portion 57 abuts against the small-diameter portion 60B. Then, the retainer 64, the notched disk 61B, the disk 61A, the retainer 65, the spacer 66, and the retaining plate 67 are successively stacked, and the cap 68 is press-fitted into the cylindrical portion 37C to secure the stacked components to the pilot body 37.

At this time, the pilot spring 59, the fail-safe spring 60, the retainer 64, the notched disk 61B, the disk 61A, the retainer 65, the spacer 66, and the retaining plate 67 have their outer peripheries guided by the inner periphery of the cylindrical portion 37C of the pilot body 37 with a predetermined tolerance therebetween and are clamped in the axial direction, thereby being secured. Therefore, it is possible to perform assembling with a necessary accuracy while allowing each component to be decentered to some extent. In addition, appropriate necessary gaps are provided between the inner diameters of the pilot spring 59 and the fail-safe spring 60 and the outer diameter of the pilot valve member 56, which is inserted into the springs 59 and 60, thereby allowing each component to be decentered to some extent. Further, appropriate necessary gaps are provided between the outer diameters of the pilot spring 59 and the fail-safe spring 60 and the inner diameter of the cylindrical portion 37C of the pilot body 37, into which the springs 59 and 60 are inserted, thereby allowing each component to be decentered to some extent.

In this embodiment, the inner diameter of the fail-safe spring 60 is larger than the inner diameter of the pilot spring 59, by way of example. In addition, a gap is provided between the outer diameter of the pilot spring 59 and the inner diameter of the cylindrical portion 37C of the pilot body 37. Consequently, if the pilot valve member 56 is decentered, the pilot spring 59, which is not clamped, can be decentered together with the pilot valve member 56 by moving diametrically. Further, because the fail-safe spring 60 has a sufficiently large inner diameter, the pilot valve member 56 is diametrically movable without being obstructed by the clamped fail-safe spring 60.

Figure 4:
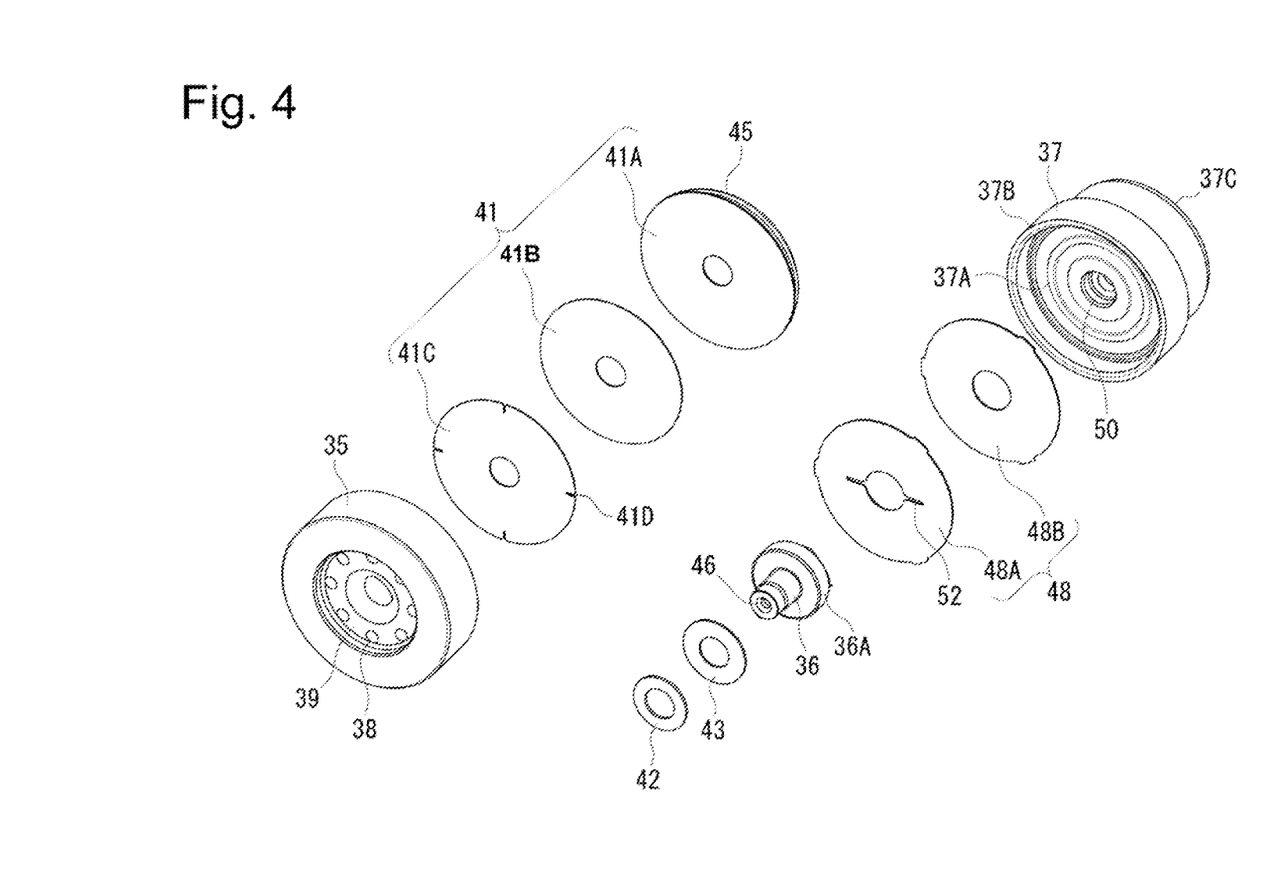
FIG. 4 is an exploded perspective view of a main valve section of the valve block of the damping force generating mechanism shown in FIG. 2.

After the assembling of the components on the cylindrical portion 37C side of the pilot body 37 has been completed, the disks 48B and 48A are inserted into the cylindrical portion 37B of the pilot body 37, which is on the side thereof opposite to the cylindrical portion 37C, so as to abut against the bottom 37A (see FIG. 4). Next, the pilot pin 36 is press-fitted into the passage 50 in the pilot body 37 to clamp the disks 48B and 48A to the bottom 37A. Then, the pilot pin 36 is inserted into the washer 43, the retainer 42, and the disks 41A and 41B and slit disk 41C of the main disk valve 41, and the elastic sliding seal member 45 is fitted to the cylindrical portion 37B. Thereafter, the main body 35 is press-fitted to the pilot pin 36 to clamp the washer 43, the retainer 42, and the disks 41A and 41B and slit disk 41C of the main disk valve 41 between the main body 35 and the enlarged-diameter portion 36A of the pilot pin 36.

At this time, the disks 48A and 48B are guided at their outer peripheries by the cylindrical portion 37B of the pilot body 37. Meanwhile, the washer 43, the retainer 42, the disk 41B, and the slit disk 41C are guided at their inner peripheries by the pilot pin 36. The disk 41A is guided by sliding of the outer periphery of the elastic seal member 45 along the cylindrical portion 37B of the pilot body 37. Because these members are axially clamped and secured, it is possible to assemble the components with a necessary accuracy while allowing each component to be decentered to some extent.

Figure 5:
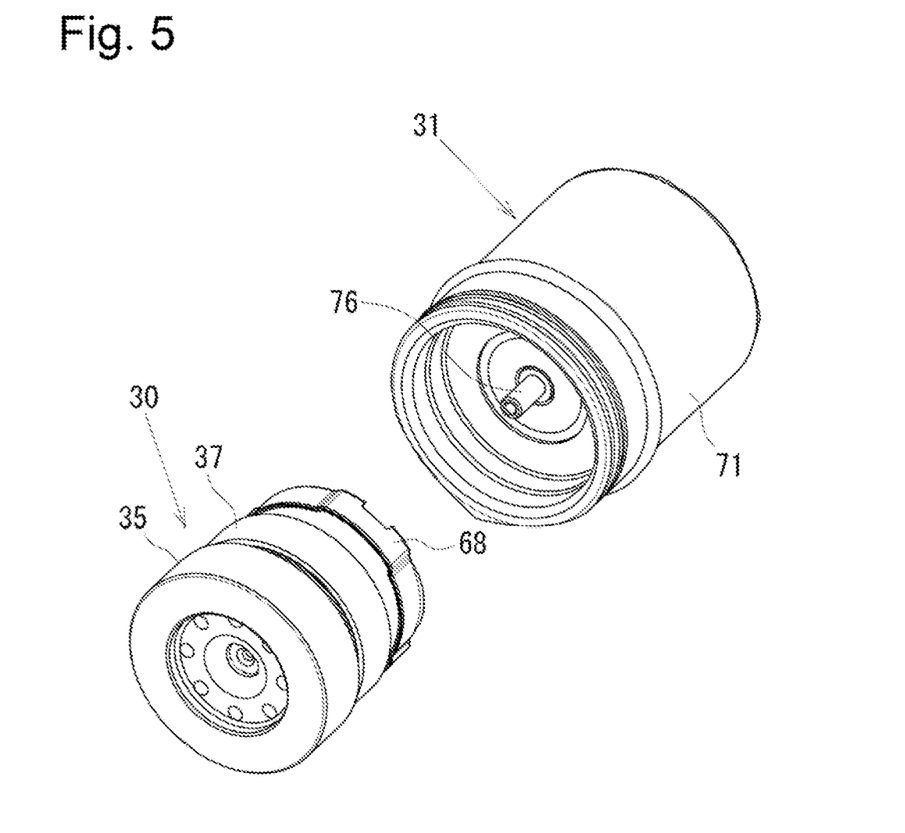
FIG. 5 is an exploded perspective view of the valve block and solenoid block of the damping force generating mechanism shown in FIG. 2.

The valve block 30 and the solenoid block 31, which have been assembled as stated above, are connected to each other. More specifically, the distal end of the actuating rod 76 is inserted into the pilot valve member 56, and the cap 68 attached to the pilot body 37 is fitted to the cylindrical portion 71A of the solenoid case 71. At this time, the actuating rod 76 can be readily inserted into the pilot valve member 56 because the actuating rod 76 and the pilot valve member 56 are provided with the tapered portions 56A and 76A, respectively. Even if the maximum tolerance is provided, the pilot valve member 56 and the actuating rod 76 can be self-aligned by the tapered portions 56A and 76A. Thus, when the valve block 30 and the solenoid block 31 are connected to each other, the pilot valve member 56 and the actuating rod 76 engage each other.

The valve block 30 and the solenoid block 31, which have been connected together into one unit as stated above, are inserted into the casing 25 having the passage member 33 and the spacer 32 inserted therein, and the nut 34 is tightened, thereby applying an axial force to the clamped portion of each component to surely secure the components. Thus, the valve block 30 and the solenoid block 31 are connected to each other.

Next, the operation of the damping force control type shock absorber 1 will be explained.

The damping force control type shock absorber 1 is installed between sprung and unsprung members of a suspension system of a vehicle, and the lead wire 79 is connected to an in-vehicle controller or the like. In a normal operating state, the coil 72 is energized to seat the pilot valve member 56 on the seat surface of the pilot body 37 to execute pressure control by the pilot valve 28.

During the extension stroke of the piston rod 6, the movement of the piston 5 in the cylinder 2 closes the check valve 13 of the piston 5. Before the disk valve 14 opens, the fluid in the cylinder upper chamber 2A is pressurized to flow through the passage 22 and the annular passage 21 into the passage member 33 of the damping force generating mechanism 26 from the connecting port 23 of the separator tube 20.

At this time, an amount of hydraulic oil corresponding to the amount of movement of the piston 5 flows into the cylinder lower chamber 2B from the reservoir 4 by opening the check valve 17 of the base valve 10. It should be noted that, when the pressure in the cylinder upper chamber 2A reaches the valve-opening pressure of the disk valve 14 of the piston 5, the disk valve 14 opens to relieve the pressure in the cylinder upper chamber 2A into the cylinder lower chamber 2B, thereby preventing an excessive increase in pressure in the cylinder upper chamber 2A.

In the damping force generating mechanism 26, the hydraulic oil flowing therein from the passage member 33 flows as follows. Before the main disk valve 41 of the main valve 27 opens (in the low piston speed region), the hydraulic oil flows through the orifice passage 46 in the pilot pin 36 and the passage 50 in the pilot body 37 and pushes open the pilot valve member 56 to flow into the valve chamber 54. The hydraulic oil flowing into the valve chamber 54 further passes through the opening of the fail-safe disk 61 and flows into the reservoir 4 through the opening 67A of the retaining plate 67, the notches 70A of the cap 68, the chamber 25B in the casing 25, and the notches 32A of the spacer 32 (see the upper half of FIG. 2). When the piston speed increases and the pressure in the cylinder upper chamber 2A reaches the valve-opening pressure of the main disk valve 41, the hydraulic oil flowing into the passage member 33 passes through the annular recess 100 and the passages 38 and pushes open the main disk valve 41 to flow directly into the chamber 25B in the casing 25.

During the compression stroke of the piston rod 6, the movement of the piston 5 in the cylinder 2 opens the check valve 13 of the piston 5 and closes the check valve 17 for the passage 15 of the base valve 10. Before the disk valve 18 opens, the fluid in the cylinder lower chamber 2B flows into the cylinder upper chamber 2A, and an amount of fluid corresponding to the amount by which the piston rod 6 enters the cylinder 2 flows from the cylinder upper chamber 2A into the reservoir 4 through a flow path similar to that during the above-described extension stroke. It should be noted that, when the pressure in the cylinder lower chamber 2B reaches the valve-opening pressure of the disk valve 18 of the base valve 10, the disk valve 18 opens to relieve the pressure in the cylinder lower chamber 2B into the reservoir 4, thereby preventing an excessive increase in pressure in the cylinder lower chamber 2B.

Thus, during both the extension and compression strokes of the piston rod 6, before the main disk valve 41 of the main valve 27 opens (in the low piston speed region) in the damping force generating mechanism 26, damping force is generated by the orifice passage 46 and the valve-opening pressure of the pilot valve member 56 of the pilot valve 28. After the main disk valve 41 has opened (in the high piston speed region), damping force is generated according to the degree of opening of the main disk valve 41. The damping force can be controlled directly, independently of the piston speed, by adjusting the valve-opening pressure of the pilot valve 28 by the electric current supplied to the coil 72. In this regard, variation in the valve-opening pressure of the pilot valve 28 causes a change in the pressure in the back-pressure chamber 49 communicating with the passage 50 at the upstream side of the pilot valve 28 through the passages 47A formed by the chamfered portion 47 of the pilot pin 36 and through the notches 52 of the disk 48A. The pressure in the back-pressure chamber 49 acts in the direction for closing the main disk valve 41. Therefore, by controlling the valve-opening pressure of the pilot valve 28, the valve-opening pressure of the main disk valve 41 can be controlled simultaneously, and hence the control range for damping force characteristics can be widened.

In this regard, when the electric current supplied to the coil 72 is reduced to reduce the thrust of the plunger 75, the valve-opening pressure of the pilot valve 28 lowers, and soft damping force is generated. When the electric current supplied to the coil 72 is increased to increase the thrust of the plunger 75, the valve-opening pressure of the pilot valve 28 rises, and hard damping force is generated. Accordingly, soft damping force, which is generally used frequently, can be generated with a reduced electric current, and the power consumption can be reduced.

In the event that the thrust of the plunger 75 is lost because of a failure such as disconnection of the coil 72, a trouble in the in-vehicle controller, etc., the pilot valve member 56 is retracted by the spring force of the fail-safe spring 60. As a result, the passage 50 opens, and the spring retaining portion 57 of the pilot valve member 56 abuts against the fail-safe disk 61 to close the flow path between the valve chamber 54 and the chamber 25B in the casing 25. In this state, the fail-safe valve 29 controls the flow of hydraulic oil in the valve chamber 54 from the passage 50 to the chamber 25B in the casing 25. Therefore, it is possible to generate a desired damping force and to adjust the pressure in the back-pressure chamber 49, i.e. the valve-opening pressure of the main disk valve 41, by setting the flow path area of the notches 61C and the valve-opening pressure of the fail-safe disk 61. Consequently, an appropriate damping force can be obtained even in the event of a failure.

Thus, the flow path for hydraulic oil when the coil 72 is energized and the hydraulic oil flow path in the event of a failure are made common to each other (serialized). Accordingly, the space efficiency can be increased, and the structure can be simplified. Therefore, productivity and assemblability can be increased. In addition, soft damping force, which is generally used frequently, can be obtained by supplying a reduced electric current to the coil 72. Accordingly, the power consumption can be reduced. When the coil 72 is unenergized, the fail-safe valve 29 provides an appropriate damping force larger than the soft damping force. Therefore, the steering stability of the vehicle can be ensured, and the fail-safe scheme can be realized. It is also possible to prevent adverse effects, e.g. an increase in vibrations input to the vehicle body due to the fact that the damping force characteristic is fixed to the hard damping force characteristic side.

The back-pressure chamber 49 is given volumetric elasticity by the flexible disk 48 and the passages 51. Therefore, it is possible to prevent the pressure in the back-pressure chamber 49 from excessively increasing, which would otherwise cause the valve-opening operation of the main disk valve 41 to become unstable, and hence possible to generate a stable damping force. The flexible disk 48 has a stacked structure comprising a plurality of disks 48A and 48B stacked over one another. Therefore, when the flexible disk 48 deflects, a damping force generated by friction between the disks 48A and 48B acts on the deflection of the flexible disk 48. Accordingly, it is possible to suppress abnormal vibration and to achieve stabilization of the operation.

In the valve chamber 54, the pilot valve member 56 is supported by the pilot spring 59 and the fail-safe spring 60, which abut against the step portions 62 and 63, respectively. Thus, there are no obstacles such as coil springs near the flow path of hydraulic oil, which spouts from the passage 50 when the pilot valve member 56 opens. Therefore, no turbulence will occur in the flow of hydraulic oil, and there is no likelihood that the fluid force acting on the pilot valve member 56 will become unstable. Accordingly, stable damping force can be generated.

Normally, both the pilot spring 59 and the fail-safe spring 60 apply their spring forces to the pilot valve member 56 (see the lower half of FIG. 2). In the event of a failure, the pilot spring 59 separates from the step portion 62, so that the spring force of the fail-safe spring 60 alone acts on the pilot valve member 56. Accordingly, it is possible to suppress variations in spring force and to generate stable damping force.

According to this embodiment, small components of the order of 20 mm in diameter are accurately assembled in the pilot body 37 of the damping force generating mechanism 26. The components are accommodated and held in the pilot body 37 in such a manner as to be unable to come off and further subassembled as a valve block 30. Thereafter, the valve block 30 is connected to a similarly subassembled solenoid block 31 into one unit and inserted into the casing 25. Therefore, the shock absorber 1 according to this embodiment is simple in structure and superior in assemblability. Accordingly, productivity can be improved. The shock absorber 1 is also capable of automated production. Further, because the shock absorber 1 can be assembled with high accuracy, reliability can be improved.

Although in this embodiment the present invention is explained as being applied to a dual-tube shock absorber having a reservoir 4, the present invention is not limited thereto but may be applied to a mono-tube shock absorber having a gas chamber formed in a cylinder by a free piston, provided that the shock absorber has a damping force generating mechanism similar to that in this embodiment. Further, the hydraulic fluid is not limited to hydraulic oil but may be water or other liquid. Alternatively, only a gas, e.g. air, or nitrogen gas, may be used, instead of using both a liquid and a gas. In such a case, the reservoir 4, the base valve 10, and the free piston are unnecessary.

In the foregoing embodiment, a pilot-controlled type shock absorber is shown, by way of example, which has a valve member formed by the pilot valve member 56, which controls the pilot pressure, and in which the valve block 30 is formed by the pilot body 37. The present invention, however, is not limited thereto but may also be applied to a shock absorber in which a valve member is selectively opened and closed directly by a solenoid, but not by a pilot pressure, thereby controlling the flow of hydraulic fluid in a cylinder and thus adjusting damping force.

Next, a second embodiment of the present invention will be explained with reference to FIGS. 7 to 9. It should be noted that, in the following, only a damping force generating mechanism, which is a main part of the present invention, is illustrated, and that members or portions similar to those of the foregoing first embodiment are denoted by the same reference numerals as in the first embodiment, and an explanation thereof is properly omitted, and further that only the points in which the second embodiment differs from the first embodiment will be explained in detail.

Figure 7:
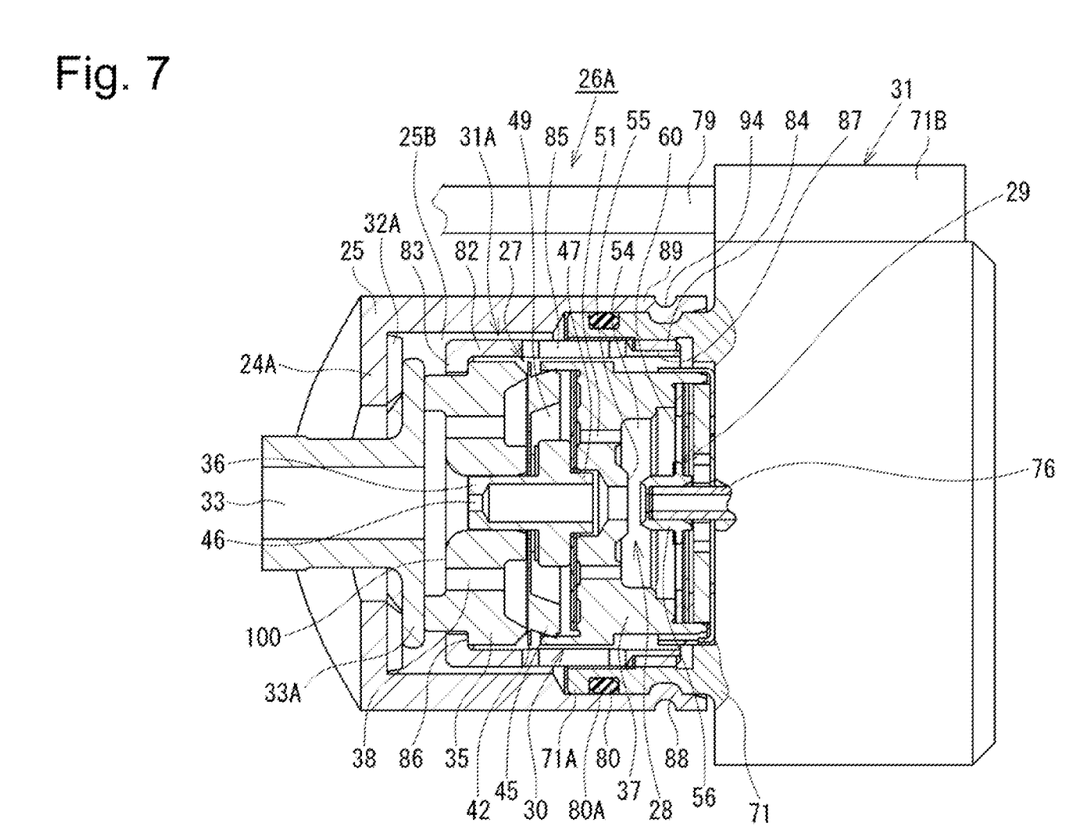
FIG. 7 is an enlarged vertical sectional view of a damping force generating mechanism of a shock absorber according to a second embodiment of the present invention.
Figure 8:
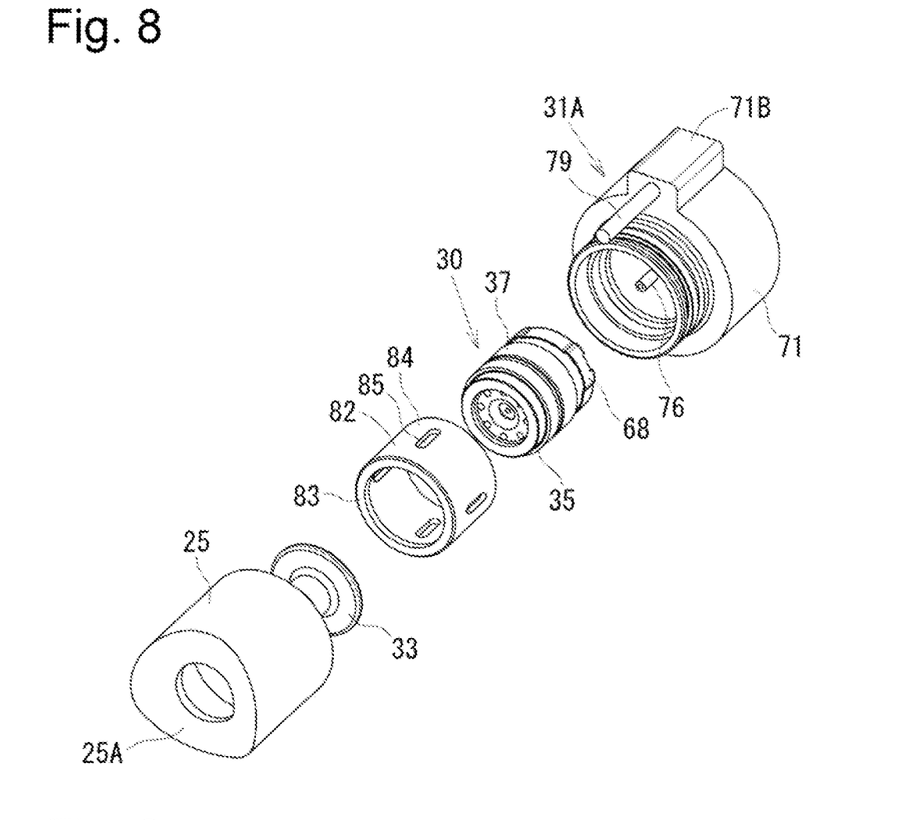
FIG. 8 is an exploded perspective view of the damping force generating mechanism shown in FIG. 7.
Figure 9:
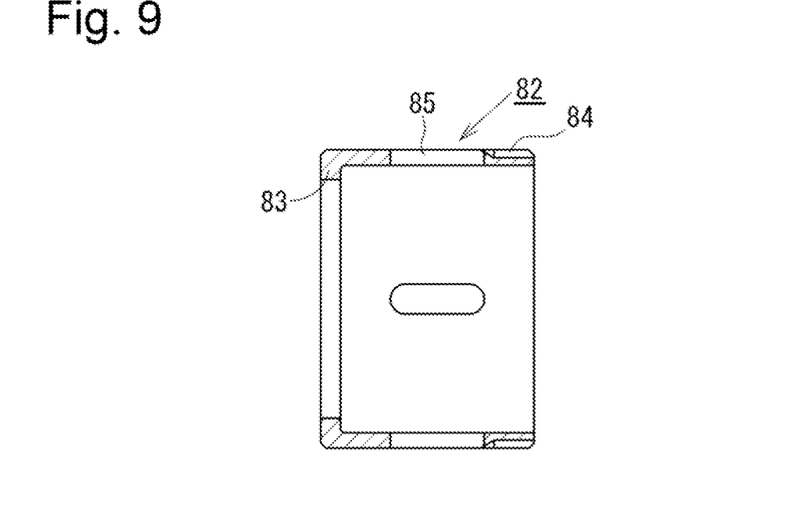
FIG. 9 is a vertical sectional view of a fastening member of the damping force generating mechanism shown in FIG. 7.

As shown in FIGS. 7 and 8, this embodiment has a damping force generating mechanism 26A arranged as follows. The valve block 30 and the solenoid block 31 are fastened together by a fastening member 82 to form a solenoid valve subassembly 31A. The solenoid valve subassembly 31A, which has the valve block 30 and the solenoid block 31 connected together into one unit, is connected to an end of the casing 25 by caulking. In this embodiment, the spacer 32 is omitted. The notches 32A are provided on the bottom of the casing 25 to form a flow path for communicating between the chamber 25B in the casing 25 and the reservoir 4.

The fastening member 82 is a substantially circular cylindrical member. The fastening member 82 has a flange portion 83 formed on the inner periphery of one end thereof. The fastening member 82 has a threaded portion 84 formed on the outer periphery of the other end thereof. The fastening member 82 has a plurality of axial slot-shaped passages 85 extending through the cylindrical side wall thereof. In the illustrated example, the passages 85 are disposed at four circumferentially equally spaced positions. It should be noted that the passages 85 may have other configurations. That is, the passages 85 may be round holes, or slits opening at the end of the fastening member 82 where the flange portion 83 is provided. The main body 35, which constitutes the valve block 30, is reduced in diameter at an end thereof that abuts against the passage member 33 to form a step portion 86. The cylindrical portion 71A of the solenoid case 71, which constitutes the solenoid block 31, has a threaded portion 87 formed on the proximal end of the inner periphery thereof. The cylindrical portion 71A has a seal groove 80A on the outer periphery thereof, which is fitted with an O-ring 80, and further has a caulking groove 88 formed as an outer peripheral groove at a position closer to the proximal end than the seal groove 80A.

The valve block 30 is inserted into the fastening member 82. The flange portion 83 of the fastening member 82 is abutted and engaged with the step portion 86 of the main body 35, and the threaded portion 84 of the fastening member 82 is screwed and fastened to the threaded portion 87 of the cylindrical portion 71A of the solenoid case 71. Thus, the valve block 30 and the solenoid block 31 are connected together into one unit to form a solenoid valve subassembly 31A, and an axial force is applied to the clamped portion of each component to secure the components reliably. At this time, the tightening torque of the fastening member 82 is controlled to apply a predetermined axial force to each component of the valve and solenoid blocks 30 and 31, thereby making it possible to increase the assembling accuracy of these components. In addition, because the components can be secured reliably, it is possible to prevent loosening and wear due to vibrations and hence possible to prevent the occurrence of contamination due to wear.

The inner periphery of the side wall of the casing 25 is enlarged in diameter at a portion thereof to which the cylindrical portion 71A of the solenoid case 71 is fitted, thereby forming a thin-walled portion 89. During the assembling process, the cylindrical portion 71A of the solenoid case 71 is inserted into the casing 25, and the main body 35 is abutted against the flange portion 33A of the passage member 33 to apply an axial force to the passage member 33 so as to obtain the required sealability for the passage member 33. In this state, the thin-walled portion 89 of the casing 25 is caulked from the outer peripheral side so as to be elastically deformed into the caulking groove 88 to form a caulked portion 94, thereby the solenoid block 31 being connected to the casing 25. At this time, the thin walled portion 89 may be caulked at a plurality of positions (e.g. eight circumferentially equally spaced positions). Alternatively, the thin-walled portion 89 may be caulked over the entire circumference. It should be noted that the passage member 33 is movable vertically, as viewed in the figure, before an axial force is applied thereto. This makes it possible to absorb misalignment between the passage member 33 inserted into the separator tube 20 and the valve block 30.

A part of the outer periphery of the solenoid case 71, which constitutes the solenoid block 31, projects radially outward beyond the outer periphery of the casing 25 to form a substantially rectangular parallelepiped boss portion 71B. A lead wire 79 is axially extended from an end surface of the boss portion 71B at the side thereof closer to the casing 25. With this structure, the lead wire 79 is disposed away from the casing 25 so that the thin-walled portion 89 of the casing 25 can be caulked.

In the manufacturing process, the solenoid valve subassembly 31A can be washed for each part and subjected to measurement of characteristics by setting the solenoid valve subassembly 31A in an in-line tester (not shown) and passing the hydraulic oil therethrough from the annular recess 100 side of the main body 35. At this time, the hydraulic oil passing through the main valve 27, the pilot valve 28, and the fail-safe valve 29 flows into the area between the main body 35 and the pilot body 37, on the one hand, and, on the other, the fastening member 82 and is discharged through the passages 85 in the fastening member 82. Thus, in this embodiment, the threaded portions 84 and 87, which are fastening portions, are disposed downstream of the main valve 27, the pilot valve 28, and the fail-safe valve 29. With this arrangement, even if contamination occurs during tightening of the threaded portions 84 and 87, the contamination is discharged to the outside, together with the hydraulic oil, through the passages 85. Therefore, no contamination can enter any of the main valve 27, the pilot valve 28, and the fail-safe valve 29. Thus, washing can be performed efficiently, and it is possible to prevent the occurrence of a problem due to contamination. Contamination discharged from the passages 85 can be removed by a filter of the in-line tester. It should be noted that the method of fastening the valve block 30 and the solenoid block 31 is not limited to the thread connection of the threaded portions 84 and 87 but may be press-fitting, welding, staking, or the like. It is possible to use a fastening method that is likely to generate contamination.

Thus, the second embodiment offers advantageous effects similar to those of the foregoing first embodiment in addition to the above.

Next, a third embodiment of the present invention will be explained with reference to FIG. 10. It should be noted that, in the following, only a damping force generating mechanism, which is a main part of the present invention, is illustrated, and that members or portions similar to those of the foregoing second embodiment are denoted by the same reference numerals as in the second embodiment, and an explanation thereof is properly omitted, and further that only the points in which the third embodiment differs from the second embodiment will be explained in detail.

Figure 10:
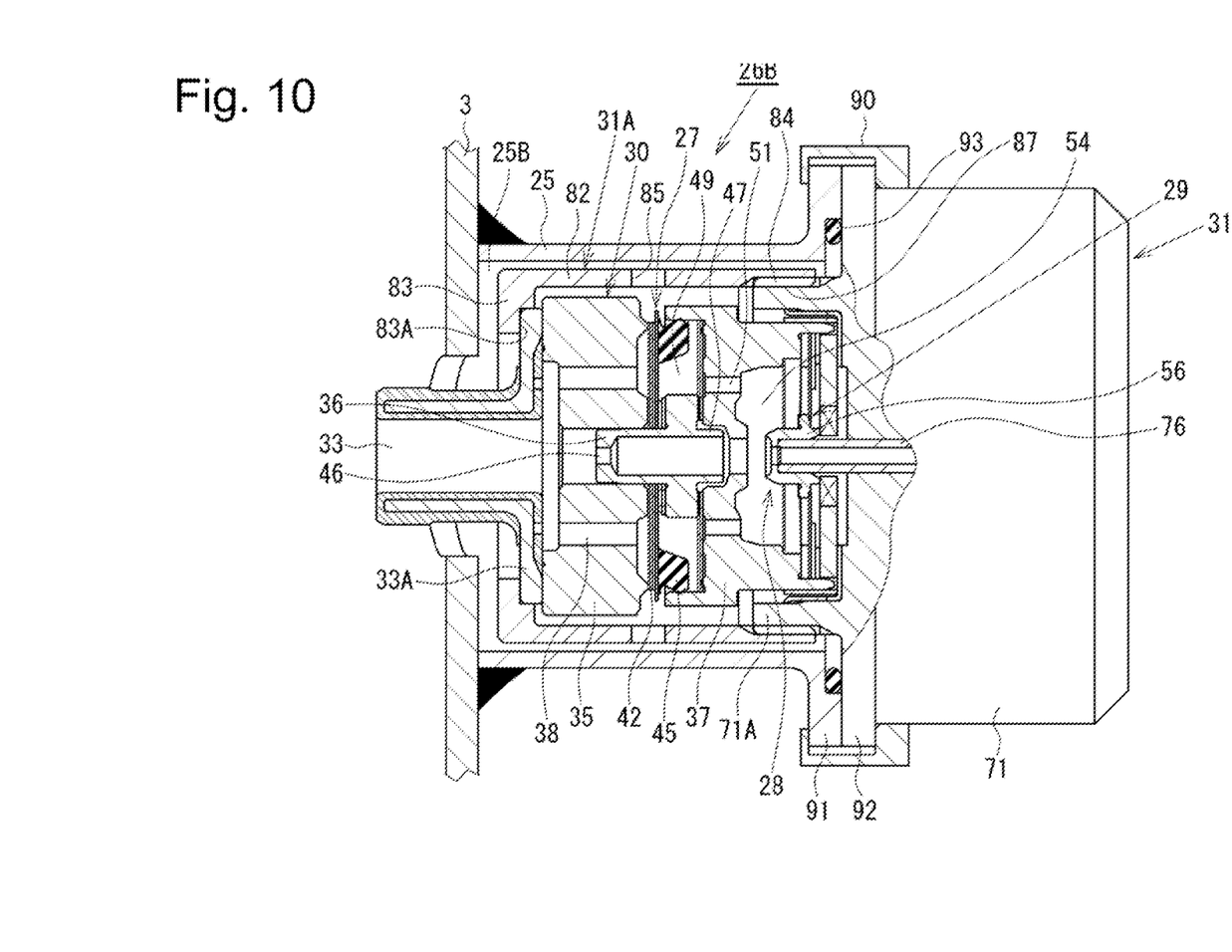
FIG. 10 is an enlarged vertical sectional view of a damping force generating mechanism of a shock absorber according to a third embodiment of the present invention.

As shown in FIG. 10, this embodiment has a damping force generating mechanism 26B arranged as follows. When the valve block 30 and the solenoid block 31 are connected together by the fastening member 82, the passage member 33 is clamped, together with the main body 35, by the flange portion 83 of the fastening member 82, thereby being connected to the solenoid valve subassembly 31A as one unit. The casing 25 and the solenoid case 71 are connected together by caulking a caulking member 90. In other words, the flange portion 33A provided at one end of the passage member 33 is disposed between the valve block 30 and the flange portion 83 provided at one end of the fastening member 82.

The fastening member 82 has an annular recess 83A formed on the inner peripheral edge on the inner side of the flange portion 83. The flange portion 33A of the passage member 33 is fitted into the annular recess 83A, thereby allowing the passage member 33 to be positioned in concentric relation to the main body 35. The passage member 33 can be stably secured in the casing 25 by connecting and securing the passage member 33 to the valve block 30 with the fastening member 82. Therefore, it is possible to reduce the requirements for the axial positioning accuracy when the solenoid valve subassembly 31A is installed in the casing 25, and it is possible to facilitate the connection made by using the caulking member 90. In addition, the passage member 33 is secured by connecting it to the valve block 30 so as to separate the flange portion 33A of the passage member 33 and the flange portion 83 of the fastening member 82 from the bottom of the casing 25 (the bottom of the casing 25 is formed by the outer tube 3 in the example shown in FIG. 10), thereby forming a flow path for communication between the chamber 25B in the casing 25 and the reservoir 4. Accordingly, it is unnecessary to form the notches 32A, which are provided on the bottom of the casing 25 in the first and second embodiments.

The casing 25 has a flange portion 91 formed around the outer periphery of the opening thereof. The solenoid case 71 has a flange portion 92 formed to face the flange portion 91. During the assembling process, the solenoid case 71 is fitted to the casing 25 so that the flange portions 91 and 92 abut against each other, and the caulking member 90 fitted onto the flange portions 91 and 92 is caulked inward to clamp the flange portions 91 and 92 to apply an axial force thereto, thereby connecting the casing 25 and the solenoid case 71 to each other. An O-ring 93 seals between the flange portions 91 and 92.

Thus, the third embodiment offers advantageous effects similar to those of the second embodiment in addition to the above.

The shock absorbers according to the foregoing embodiments are capable of increasing the productivity of the damping force generating mechanism.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2011-121831 filed on May 31, 2011 and No. 2012-043679 filed on Feb. 29, 2012.

The entire disclosure of Japanese Patent Applications No. 2011-121831 filed on May 31, 2011 and No. 2012-043679 filed on Feb. 29, 2012 including specification, claims, drawings and summary is incorporated herein by reference in its entirety.

What is claimed is:

1. A shock absorber comprising:
a cylinder including a hydraulic fluid sealed therein;
a piston slidably fitted in the cylinder;
a piston rod connected to the piston and extended to an outside of the cylinder; and
a damping force generating mechanism arranged to generate damping force by controlling a flow of hydraulic fluid caused by sliding movement of the piston in the cylinder,
the damping force generating mechanism comprising:
a valve block; and
a solenoid block,
the valve block including:
a casing member provided with an insert hole, the casing member comprising a body having a valve chamber therein, and a cover attached to the body to define the valve chamber; and
a valve member retained in the valve chamber of the casing member to selectively seat on and unseat from a seat portion provided in the casing member,
the solenoid block including:
an actuating rod arranged to face the valve member retained in the valve chamber of the casing member of the valve block;
the solenoid block being connectable to the valve block;
wherein the valve block comprises an integral unit which includes the valve member, the cover and the body of the casing member, and
wherein the cover is fixedly secured to the body of the casing member, and
wherein the actuating rod extends through the insert hole of the valve block to engage with the valve member as a result of the valve block and the solenoid block being connected to each other.

2. The shock absorber of claim 1, further comprising:
an outer tube provided around the cylinder, the outer tube being provided with a cylindrical casing accommodating the valve block;
wherein the valve block and the solenoid block are connected to each other by attaching the solenoid block to the casing having the valve block of the unit accommodated therein.

3. The shock absorber of claim 2, further comprising fastening portions fastening a joint between the valve block and the solenoid block.

4. The shock absorber of claim 3, further comprising an outer tube provided around the cylinder, the outer tube being provided with a cylindrical casing accommodating the valve block,
wherein the valve block and the solenoid block are attached to the casing with the valve block and the solenoid block being connected to each other.

5. The shock absorber of claim 1, wherein the casing member has one end of a connecting member connected to a side thereof opposite to the valve chamber, the connecting member being provided at another end thereof with a disk valve controlling a flow of hydraulic fluid.

6. The shock absorber of claim 5, wherein the connecting member has a fitting portion fitted into a fitting hole formed in the casing member, thereby the connecting member being connected to the casing member, the fitting portion having an axially extending cut portion formed so that a flow passage for hydraulic fluid is formed in a gap between the cut portion and the fitting hole.

7. The shock absorber of claim 1, wherein the cover is secured to body with a separate fastening structure.

8. The shock absorber of claim 1, wherein the valve block is detachable from the solenoid block with the valve member, the cover and the body being kept as the integral unit.

9. The shock absorber of claim 1, further comprising fastening portions fastening a joint between the valve block and the solenoid block, the fastening portions being positioned downstream of the valve member.

10. The shock absorber of claim 1, further comprising an urging member provided in the valve chamber of the casing member to urge the valve member in a direction away from the seat portion.

11. The shock absorber of claim 1, wherein:
the valve member is substantially cylindrical and comprises a distal end portion thereof that selectively seats on and unseats from the seat portion;
the valve member has a rod-receiving portion formed at an inner peripheral side portion thereof;
the diameter of an inner periphery of the rod-receiving portion is smaller than a diameter defined by the inner peripheral side portion;
the actuating rod arranged to be fitted into the inner peripheral side portion of the valve member; and
the distal end portion of the actuating rod is capable of abutting against the rod-receiving portion.

12. The shock absorber of claim 11, wherein:
the valve member includes an opening at the opposite side of the distal end of the valve member;
an inner peripheral edge of the opening of the valve member is formed with a tapered portion that is gradually enlarged in diameter toward the opening; and
the distal end of the actuating rod is tapered to form a tapered portion on an outer peripheral edge thereof.

13. The shock absorber of claim 11, wherein the valve member has a flange-shaped spring retaining portion on an outer periphery thereof, and the diameter of the flange-shaped spring retaining portion is larger than that of the outer periphery,
the shock absorber further comprises a substantially plate-shaped spring arranged to urge the valve member in a direction away from the seat portion, an inner peripheral side of the plate-shaped spring acting on the spring retaining portion.

14. A shock absorber comprising:
a cylinder including a hydraulic fluid sealed therein;
a piston slidably fitted in the cylinder;
a piston rod connected to the piston and extended to an outside of the cylinder; and
a damping force generating mechanism arranged to generate damping force by controlling a flow of hydraulic fluid caused by sliding movement of the piston in the cylinder;
the damping force generating mechanism comprising:
a valve block; and
a solenoid block,
the valve block including:
a casing member provided with an opening; and
a valve member retained in the casing member to selectively seat on and unseat from a seat portion formed in the casing member, the solenoid block including:
an actuating rod arranged to face the valve member retained in the valve chamber of the casing member of the valve block, the solenoid block being connectable to the valve block,
wherein the valve member and the actuating rod are engaged with each other as a result of the valve block and the solenoid block being connected to each other,
wherein the shock absorber is provided with fastening portions to fasten a joint between the valve block and the solenoid block, the fastening portions being positioned downstream of the valve member,
wherein the shock absorber further comprises:
a fastening member at least partially having the fastening portions;
wherein, as a result of the valve block being inserted into the fastening member, one end of the fastening member is engaged with the valve block, and another end of the fastening member is fastened to the solenoid block by the fastening portions, whereby the valve block and the solenoid block are connected to each other with an axial force being applied to the valve block.

15. The shock absorber of claim 14, wherein the damping force generating mechanism is disposed at a side of the cylinder, and one end of a communicating member communicating with an interior of the cylinder is disposed between the one end of the fastening member and the valve block.

16. The shock absorber of claim 14, further comprising an outer tube provided around the cylinder, the outer tube being provided with a cylindrical casing accommodating the valve block,
wherein the valve block and the solenoid block are connected to each other by attaching the solenoid block to the casing having the valve block accommodated therein.

17. The shock absorber of claim 16, wherein one end of a communicating member communicating with an interior of the cylinder is disposed between the one end of the fastening member and the valve block.

18. The shock absorber of claim 14, wherein the casing member has one end of a connecting member connected to a side thereof opposite to the opening, the connecting member being provided at another end thereof with a disk valve controlling a flow of hydraulic fluid.

19. The shock absorber of claim 18, wherein the damping force generating mechanism is disposed at a side of the cylinder, and one end of a communicating member communicating with an interior of the cylinder is disposed between the one end of the fastening member and the valve block.

20. The shock absorber of claim 14, further comprising an urging member provided in the valve chamber of the casing member to urge the valve member in a direction away from the seat portion.

21. The shock absorber of claim 14, wherein:
the valve member is substantially cylindrical and comprises a distal end portion thereof that selectively seats on and unseats from the seat portion;
the valve member has a rod-receiving portion formed at an inner peripheral side portion thereof;
the diameter of the inner peripheral of the rod-receiving portion is smaller than a diameter defined by the inner periphery side portion;
the actuating rod arranged to be fitted into the inner peripheral side portion of the valve member;
the distal end portion of the actuating rod is capable of abutting against the rod-receiving portion;
the valve member includes an opening at the opposite side of the distal end of the valve member;
an inner peripheral edge of the opening of the valve member is formed with a tapered portion that is gradually enlarged in diameter toward the opening; and
the distal end of the actuating rod is tapered to form a tapered portion on the outer peripheral edge thereof.

22. A shock absorber comprising:
a cylinder including a hydraulic fluid sealed therein;
a piston slidably fitted in the cylinder;
a piston rod connected to the piston and extended to an outside of the cylinder; and
a damping force generating mechanism arranged to generate damping force by controlling a flow of hydraulic fluid caused by sliding movement of the piston in the cylinder,
the damping force generating mechanism comprising:
a valve block; and
a solenoid block,
the valve block including:
a casing member provided with an insert hole, the casing member comprising a body having a valve chamber therein, and a cover attached to the body to define the valve chamber; and
a valve member retained in the valve chamber of the casing member to selectively seat on and unseat from a seat portion provided in the casing member,
the solenoid block including:
an actuating rod arranged to face the valve member retained in the valve chamber of the casing member of the valve block;
the solenoid block being connectable to the valve block;
wherein the shock absorber further comprises a unit which is configured by the valve member received in the valve block and by the cover attached to the body,
wherein the actuating rod extends through the insert hole of the valve block to engage with the valve member as a result of the valve block and the solenoid block being connected to each other, and
wherein the body is in the shape of a substantially circular cylinder having a bottom, and the cover is secured to the body by a cap being press-fitted into the cylindrical portion of the body.

23. The shock absorber of claim 22, wherein the cap includes a passage arranged to provide communication between the valve chamber and a chamber provided around the outer periphery of the body.

24. The shock absorber of claim 23, wherein
the cap has a small-diameter portion fitted to the outer periphery of the body and a large-diameter portion which is larger than the small-diameter portion,
the small-diameter portion and the large-diameter portion are alternately formed along the circumferential direction of the cap,
the cap has an inward flange portion at an end thereof,
the inward flange portion has notches radially extending from the inner peripheral edge thereof to the large-diameter portions, and
the passage comprises the notches.

* * * * *